United States Patent [19]
Power

[11] Patent Number: 5,822,916
[45] Date of Patent: Oct. 20, 1998

[54] ELECTRONICALLY AUTOMATED PORTABLE LIVE AND BAIT WELL

[76] Inventor: Mark Gerard Power, 16041 Excel Way, Rosemount, Minn. 55068

[21] Appl. No.: 633,107

[22] Filed: Apr. 16, 1996

[51] Int. Cl.[6] .................................................. A01K 97/05
[52] U.S. Cl. ........................................ 43/57; 126/121.2
[58] Field of Search ........................... 43/57, 55, 56, 43/17.5; 261/121.2; 206/315.11

[56] References Cited

U.S. PATENT DOCUMENTS

| | | | |
|---|---|---|---|
| 3,822,498 | 7/1974 | Butler | 43/57 |
| 4,168,590 | 9/1979 | Beshoner, Sr. | 43/55 |
| 4,271,099 | 6/1981 | Kukla | 261/121.2 |
| 4,462,180 | 7/1984 | Scott | 43/57 |
| 4,748,765 | 6/1988 | Martin | 43/55 |
| 4,776,127 | 10/1988 | Jackson | 261/121.2 |
| 4,815,411 | 3/1989 | Burgess | 43/57 |
| 4,821,445 | 4/1989 | Bass | 43/55 |
| 4,896,452 | 1/1990 | Smith et al. | 43/57 |
| 4,945,672 | 8/1990 | Raia | 43/57 |
| 5,050,526 | 9/1991 | Nelson et al. | 43/57 |
| 5,193,301 | 3/1993 | Figgins | 43/57 |
| 5,231,789 | 8/1993 | Radmanovich | 43/57 |
| 5,305,544 | 4/1994 | Testa, Jr. | 43/57 |
| 5,347,746 | 9/1994 | Letson | 206/315.11 |

Primary Examiner—Joseph J. Hail, III

[57] ABSTRACT

A battery operated storage container which is divided into two compartments, one for bait and a second for fish caught. It incorporates a pump for filling the compartments to a preset level and a pump to empty the compartments. It also contains an electronic control panel which allows the user to select which functions he/she wants to perform. These functions include filling, emptying, recycling, and aerating the water. The functions can be performed simultaneously or independently.

20 Claims, 1 Drawing Sheet

ELECTRONICALLY AUTOMATED PORTABLE LIVE AND BAIT WELL

BACKGROUND OF THE INVENTION

This invention relates, in general, to accessories for fishermen, and, in particular, to an electronically controlled well for live bait as well as fish which have been caught.

DESCRIPTION OF PRIOR ART

In the prior art various types of bait wells have been proposed. For example, U.S. Pat. No. 4,896,452 discloses a bait well having an aerator which is solar powered. U.S. Pat. No. 5,050,526 discloses a live well for fish and ice chest combination with straps for fixedly attaching the well to a fishing boat. U.S. Pat. No. 5,193,301 discloses a portable bait or minnow bucket designed to fit within an insulated receptacle. U.S. Pat. No. 5,231,789 discloses a combination dry bait container and aerator apparatus which will fit into a commercially available thermally insulated chest-type cooler. U.S. Pat. No. 5,305,544 discloses a multi-compartment insulated chest having a lower portion divided into two compartments and an upper compartment with a lid and a secondary hatch.

Although many bait wells have been proposed, the prior art devices either do not make provisions for a complete well or require some functions to be performed manually or not at all. The present invention takes into account all the needed functions required by a serious fisherman and provides a single bait well which will perform all necessary functions without undue attention from the user.

SUMMARY OF THE INVENTION

The present invention incorporates a battery operated storage container which is divided into two compartments, one for bait and a second for fish caught. It incorporates a pump for filling the compartments to a preset level and a pump to empty the compartments. It also contains an electronic control panel which allows the user to select which functions he/she wants to perform. These functions include filling, emptying, recycling, and aerating the water. The functions can be performed simultaneously or independently. In addition the unit is portable and is not restricted to being permanently mounted. Also, the input and discharge lines have conventional snap-on/snap-off connectors for easy connection and disconnection of water lines. This will eliminate the need to screw or unscrew the water or discharge lines.

It is an object of the present invention to provide an electronically controlled live fish and bait well which can fill, empty the well, as well as recycle or aerate the water in the well.

It is an object of the present invention to provide an electronically controlled live fish and bait well which can automatically fill the well to a preset limit.

It is an object of the present invention to provide an electronically controlled live fish and bait well which can automatically perform several functions simultaneously or independently.

These and other objects and advantages of the present invention will be fully apparent from the following description, when taken in connection with the annexed drawings.

DESCRIPTION OF THE PREFERRED EMBODIMENT

Figure 1:
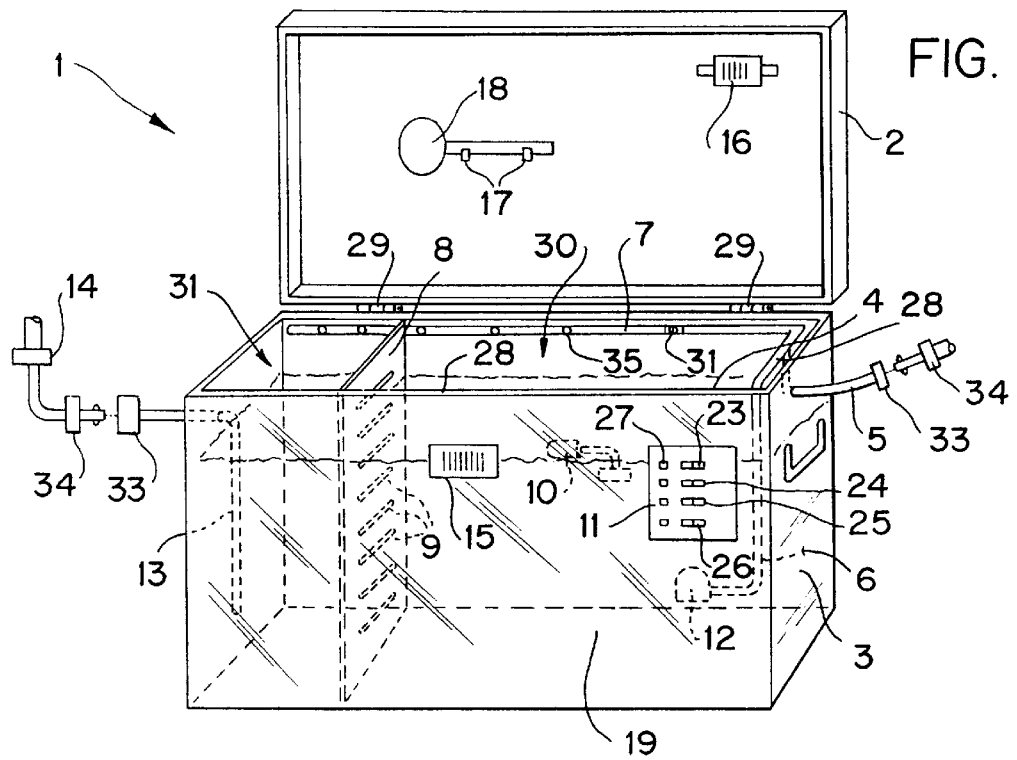
FIG. 1 is a perspective view of the present invention.

Referring now to the drawings in greater detail, FIG. 1 shows a perspective view of the live fish and bait well 1. It consists of a box 3 having an outer wall and an inner wall 4 which are separated by a space 28. This space serves two purposes, it allows electrical wires W to be run to various fixtures (as will be explained more fully below) and it allows the well to be insulated. The insulation I can be any conventional type of insulation for example, but not limited to, foam insulation. The box 3 includes a handle H shaped from edge portions of a sidewall of the box 3.

The well has a lid 2 which is hinged to the well by any conventional hinges 29. The lid can also have a conventional latch (not shown) to secure the lid 2 to the box 3. On the inside of the lid is a pair of conventional spring clips 17 which can be used to hold accessories such as, but not limited to, a minnow net 18. Also mounted on the inside of the lid is a dome light 16. The wires for the dome light can be run through the space 28, through the hinge 29, through the walls of the lid 2, and then to the light 16. Alternatively, the dome light 16 could be battery operated.

The well 1 is divided into two separate compartments 30, 31 by an optional removable panel 8 which has narrow apertures 9 placed therein. The panel 8 can be permanently installed within the well or it can be removable. For example, the front and back walls of the well could be provided with grooves (not shown) which would receive the edges of the panel 8 to allow it to be removed. The compartment 30 could be used to store fish that have been caught, and the compartment 31 could be used to store live bait fish such as, but not limited to, minnows. The apertures 9 allow water to be exchanged between the two compartments. The apertures should be wide enough so a proper amount of water can be transferred from one compartment to the other, but small enough so the bait fish can not swim from one compartment to the other.

Within the well 1 is mounted a pump 12 which can be a small pump, known as a sump pump, and which can be activated by the control panel. The pump can be run from a conventional 12 volt electrical source and turned on or off by one of the switches on the control panel 11. The electrical source could be the electrical system found on most boats, or it could be a stand alone battery. The pump 12 is connected by means of tubes or pipes 6 and 28 to pipe 7, which has a series of apertures 35 spaced therealong. When the pump 12 is turned on by way of the control panel 11, it will force water through the pipes or tubes 6 and 28 to pipe 7, and then through apertures 35 in order to aerate or circulate the water in the well. It should be noted that the pipe or tube 7 is shown mounted near the top of the well, however, the location is not critical and it could be mounted anywhere. Also, the apertures 35 are shown as directed toward the front of the well, but they could also be directed downward, toward the floor.

On one side of the well is an discharge pipe 5 and on the other side is an intake pipe 13. The pipes can be mounted anywhere on the well and serve the same functions. Connected to the intake pipe 13 is another conventional pump 14. The pump 14 can be connected to a source of water and when turned on will supply the well with water for the bait fish as well as any fish that have been caught. Also, since the well is provided with a discharge pipe 5, the user can keep the pumps 12 and 14 running and, thereby, keep a supply of fresh water constantly running into and out of the well. Input line or pipe 13 has snap-on/snap-off connectors 33, 34 for easy connection and disconnection of water lines. Discharge line or pipe 5 has snap-on/snap-off connectors 33, 34 for easy connection and disconnection of water lines. In addition, a cutoff float 10 can be mounted to the inside of the well so that when the water level reaches a preselected level, power to the pump 14 will be cut off. The float 10 is a conventional float similar to the floats used in condensate pumps in home furnaces or bilge pump float switches.

Figure 2:
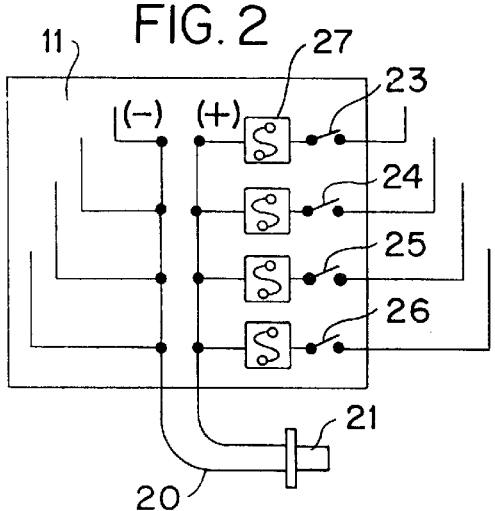
FIG. 2 is a schematic view of the wiring diagram of the present invention.

On the front wall of the well is mounted another light 15 and a control panel 11, which will control the various electrical items such as the pumps and the lights. The control panel 11 is shown schematically in FIG. 2. It consists of a series of fuses 27 which are connected in series to switches 23–26. The switches are preferably the rocker type of switch which will light up when the switch is turned on, however, other types of switches could be used without departing from the scope of the invention. Switch 23 could be attached to the light 16, switch 24 to light 15, switch 25 to pump 12, and switch 26 to pump 14. These assignments are merely for illustration purposes, and any of the switches could be attached to any of the various electrical components. Also, additional switches could be added to control other electrical devices which a user might want to incorporate into the well.

The various switches and fuses are connected by means of a wire 20 and standard 12 volt connector 21 to a power source 21A, such as a stand alone battery, referred to above, or to a 12 volt power source. Also, if desired the well can be hard wired to a boats electrical system if the well is to be a permanent fixture on the boat.

Figure 3:
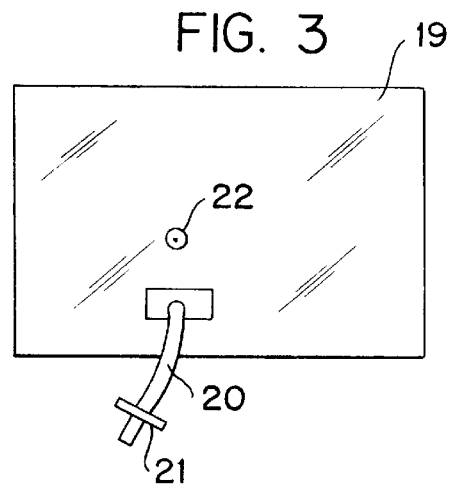
FIG. 3 is a view of the back of the present invention.

As shown in FIG. 3 the power cord 20 exits from the back wall 19 of the well, however, this location is not critical and the power cord could be mounted in any convenient location. Also mount on the back wall is a jack 22 which can be used to attach a conventional external pump (not show) or some other electrical device.

Figure 4:
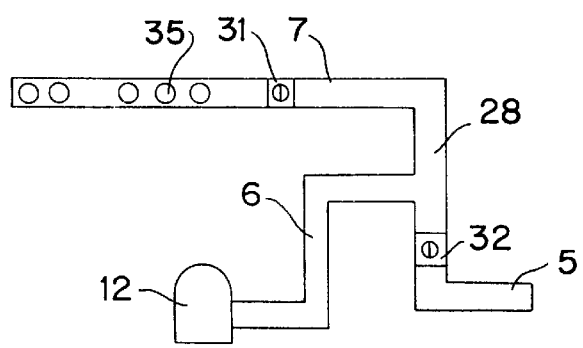
FIG. 4 is a schematic view of the recirculation system of the present invention.

FIG. 4 shows a schematic view of the recirculation system of the present invention. Pump 12 is connected to pipe 6 which is connected to pipes 28 and 5. Pipe 28 is connected to pipe 7 which has apertures 27, as explained above. Connected in pipe 7 is a conventional water valve 31, and a similar valve 32 is connected between pipes 28 and 5. If the user wants to recirculate the water in the well he/she opens valve 31 and closes valve 32, which will cause pump 12 to recirculate the water in the well. If the user wants to dump the water in the well he/she opens valve 32 and closes valve 31, which will cause pump 12 to pump the water out of the well.

Although the live fish and bait well and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A container for holding live bait and fish that have been caught, said container comprising:

an insulated portable box comprising a bottom, front, back, sides, an inside portion, and an open top, with the insulated portable box further comprising an inlet and an outlet, a lid for closing said open top, a divider within said box for dividing said box into at least two compartments, with one of the compartments for holding the live bait and with the other of the compartments for holding the fish that have been caught, said divider having apertures communicating between said compartments, with a size of the apertures being less than a size of the live relatively small bait to prevent such small bait from swimming to the other compartment, with the size of the apertures being sufficiently large to permit water exchange between the two compartment, a first pump for supplying water to said box, with the first pump engaged to an inlet conduit which is engaged with the inlet of the box, a second pump for recirculating water in said box and for pumping water out of said box, with the second pump engaged with an outlet conduit which is engaged with the outlet of the box, and a cutoff apparatus which automatically controls the level of water in said box, with at least a portion of said cutoff apparatus mounted on the inside portion of said box such that, when the level of water reaches a preselected level in said box, the cutoff apparatus automatically communicates with the first pump to cut off the supply of water provided by the first pump, and wherein said cutoff apparatus for controlling the level of water in said box comprises a cutoff float apparatus.

2. The container for holding live bait and fish that have been caught as claimed in claim 1, wherein said lid has a light mounted thereon.

3. The container for holding live bait and fish that have been caught as claimed in claim 1, wherein said box has a light mounted on at least one of said sides.

4. The container for holding live bait and fish that have been caught as claimed in claim 1, wherein said box has a combination recirculation system and water pumping system for pumping water out of the box, said systems comprising a first pipe connected to said second pump means, second and third pipes connected to said first pipe, said second pipe used for pumping water out of the box, said third pipe connected to a fourth pipe which has a plurality of apertures therein, first valve means connected between said second and third pipes, second valve means connected between said third and fourth pipes, whereby when said first valve means is closed and said second valve means is open, water is recirculated by said second pump means to said box, and when said first valve means is open and said second valve means is closed, water is pumped by said second pump means out of said box.

5. The container for holding live bait and fish that have been caught as claimed in claim 1, wherein said lid has at least a pair of catch means for holding fishing accessories.

6. The container for holding live bait and fish that have been caught as claimed in claim 1, wherein said first pump is connected by means of a snap-on/snap-off connector to a pipe permanently mounted at least partially in said container.

7. The container according to claim 1 and further comprising a connection on the box for an electrical device.

8. The container according to claim 1 and further comprising a power cord extending from the box.

9. The container according to claim 1 and further comprising a power source which comprises a stand alone battery.

10. The container according to claim 1 and further comprising a power source which comprises a 12 volt electrical source.

11. The container according to claim 1 and further comprising a power source which comprises a stand alone power source.

12. The container according to claim 1 and further comprising a conduit section disposed in the box and having apertures therein for spraying streams of water into the box to aerate water in the box, with the apertures being structured such that water is sprayed generally directly from the apertures to a surface of the water in the box.

13. The container according to claim 1 and further comprising a conduit section on an outside of the box, with the conduit section being engaged to one of the inlet and outlet via a snap-on/snap-off connector.

14. The container according to claim 1 wherein the first and second pumps pump water into and out of the box at the same time.

15. The container according to claim 1 wherein at least one of the front, back, and sides comprises inner and outer wall portions and insulation between the inner and outer wall portions.

16. The container according to claim 1 wherein at least one of the front, back, and sides comprises inner and outer wall portions and an electrical wire between the inner and outer wall portions, with the electrical wire running to at least one electrical fixture of the box.

17. The container according to claim 1 wherein the box includes a handle.

18. The container according to claim 1 wherein the divider is removable from the box.

19. A container for holding bait fish and fish that have been caught, said container comprising:

an insulated box having a bottom, front, back, sides and an open top, a lid for closing said open top, divider means within said box for dividing said box into at least two compartments, said divider means having apertures communicating between said compartments, first pump means for supplying water to said box, second pump means for recirculating water in said box and for pumping water out of said box, electrical switch means for controlling said first and second pump means, and cut-off float means for controlling the level of water in said box.

20. A container for holding bait fish and fish that have been caught, said container comprising:

an insulated box having a bottom, front, back, sides and an open top, a lid for closing said open top, divider means within said box for dividing said box into at least two compartments, said divider means having apertures communicating between said compartments, first pump means for supplying water to said box, second pump means for recirculating water in said box and for pumping water out of said box, electrical switch means for controlling said first and second pump means, wherein said box has a combination recirculation system and water pumping system for pumping water out of the box, said systems comprising a first pipe connected to said second pump means, second and third pipes connected to said first pipe, said second pipe used for pumping water out of the box, said third pipe connected to a fourth pipe which has a plurality of apertures therein, first valve means connected between said second and third pipes, second valve means connected between said third and fourth pipes, whereby when said first valve means is closed and said second valve means is open, water is recirculated by said second pump means to said box, and when said first valve means is open and said second valve means is closed, water is pumped by said second pump means out of said box, and said second pipe is connected to a fifth pipe by means of a snap-on/snap-off connector.

* * * * *